Oct. 16, 1945.                O. GILBERTSON                    2,387,015
                                ELECTRIC SWIVEL
                              Filed Oct. 5, 1943              2 Sheets-Sheet 1
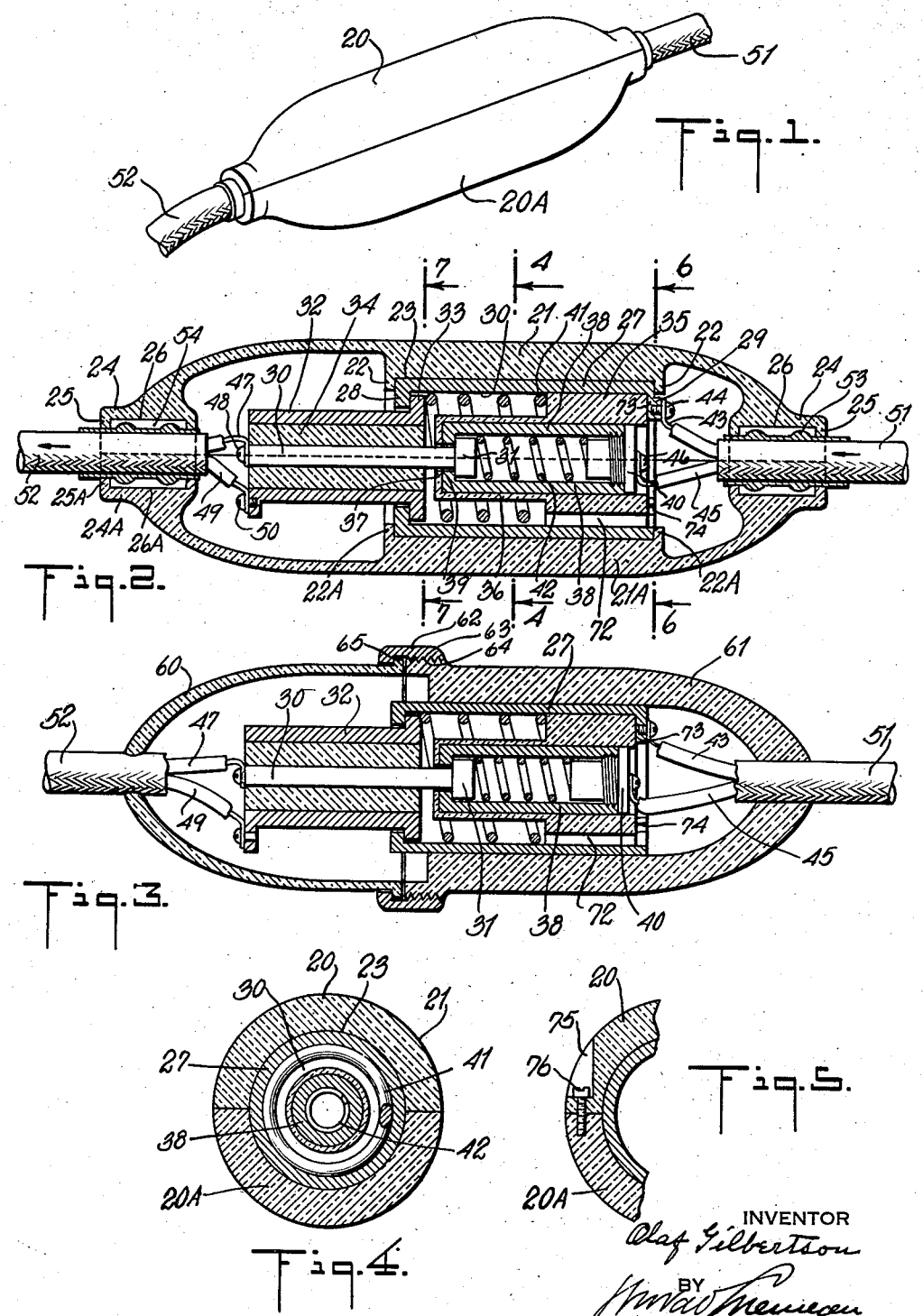

Oct. 16, 1945.  O. GILBERTSON  2,387,015
ELECTRIC SWIVEL
Filed Oct. 5, 1943  2 Sheets-Sheet 2
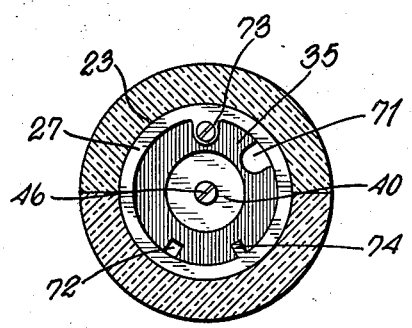
Fig. 6.
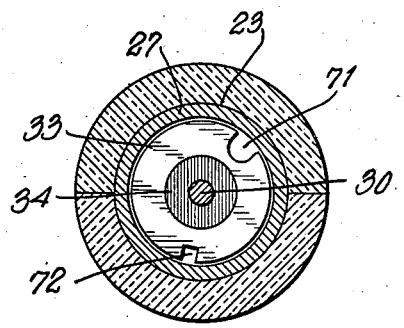
Fig. 7.
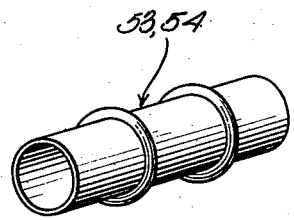
Fig. 8.
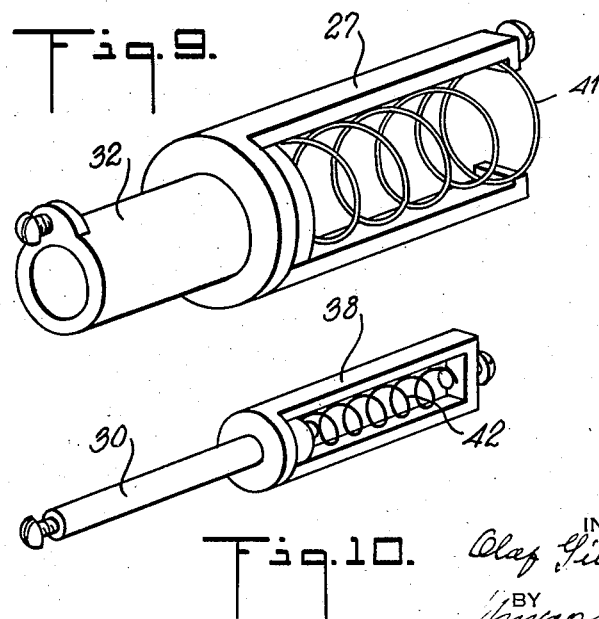
Fig. 9.
Fig. 10.
INVENTOR
Olaf Gilbertson
BY
his ATTORNEY Patented Oct. 16, 1945

2,387,015

UNITED STATES PATENT OFFICE 2,387,015

ELECTRIC SWIVEL

Olaf Gilbertson, Matawan, N. J.

Application October 5, 1943, Serial No. 505,074

1 Claim. (Cl. 173—324)

My invention relates to swivels and refers particularly to swivels adapted for use in electric currents.

In the use of devices connected by wires to a source of electric current, the wires are liable to become twisted during the revolution of the device, thus resulting not only in inconvenience but also to the danger of breaking the wires causing a short circuit.

The object of my device is means whereby the revolution of an object upon one end of electric wires will not twist the wires connecting the object to a source of electric current, but will allow the wires to remain in an untwisted condition irrespective of any revolution to which the object may be subjected.

The advantages of a device adapted for this purpose are so evident as not to need further explanation.

In the accompanying drawings illustrating modified forms of my invention similar parts are designated by similar numerals.

Figure 1 is a perspective view of one form of a device of my invention.

Figure 2 is a vertical section of the device of Figure 1.

Figure 3 is a vertical section of a modified form of a device of my invention.

Figure 4 is a section through the line 4—4 of Figure 2.

Figure 5 is a sectional view of a modified means for attaching the casing sections together.

Figure 6 is a section through the line 6—6 of Figure 2.

Figure 7 is a section through the line 7—7 of Figure 2.

Figure 8 is a perspective view of cable-holding member shown in the left hand portion of Figure 2.

Figure 9 is an enlarged perspective view of certain members of the device of Figure 2.

Figure 10 is an enlarged perspective view of certain members of the device of Figure 2.

The particular form of my device shown in Figures 1, 2, 4, 6 and 7 comprises two casing parts 20 and 20A, identical in their construction.

The casing portion 20, which is made of non-electric conducting material, comprises a central inwardly extended semi-annular portion 21 having peripheral flanges 22, 22 forming a recess 23. Each end portion of the casing portion 20 has an enlarged portion 24 having a peripheral flange 25 forming a recess 26. Positioned within the recess 23 of the member 21 is an annular member 27 of electric-conducting material having peripheral flanges 28 and 29 forming a recess 30.

For purposes of clearness of description it will be assumed that the electric current enters the right end of the device referred to as the entrance end, and passes out of the left end of the device referred to as the exit end of the device, as indicated by the arrows in Figure 1.

Positioned in the exit end portion of the device is a rod 30 of electric-conducting material having the enlarged end portion 31. An annular member 32 has the outwardly extended flange 33 abuttable upon the flange 28 of the member 27, the rod 30 and the member 32 being separated by the non-conducting material 34.

Positioned within the space formed by the annual member 27 is an annular non-conducting member having the enlarged portion 35 abutting upon the inner face of the member 27 and an annular portion 36 spaced from the inner face of the member 27, said portion having the inwardly directed flange 37.

Positioned within the non-conducting member 35 is an annular hollow electric-conducting member 38, one end of which has the flange 39 so adapted as to allow the member 31 of the rod 30 to abut upon the inner face thereof. A threaded plug closure 40 is capable of meshing with the interior threaded open end of the member 38.

A coil spring 41 maintains the flange 33 of the member 32 in contact with the flange 28 of the member 27 and a coil spring 42 maintains the end members 31 of the rod 30 in contact with the flange 39 of the member 38.

One wire 43 from a source of electric current is connected at 44 to the member 29 of the member 27 and the other wire 45 from said electric source is connected at 46 to the plug 40.

An outgoing wire 47 is connected at 48 with the rod 30 and the other wire 49 is connected at 50 to the member 32.

The two cables 51 and 52 carrying these two sets of wires, respectively, pass through openings in each end of the device and are revoluble with the bushings 53 and 54, said bushings being maintained in position by the extended portions entering recesses in the end members 24, 24A.

The two portions of the casing may be attached to each other by welding or by any other suitable means.

It will be noted that the current will enter through the wire 43 and pass through member 27 and member 32 and thence outwardly through the wire 49; and that the current will also enter through the wire 45, through the member 38 and the rod 30 and thence outwardly through the wire 47.

If the entering wires 43 and 45 remain stationary with respect to the casing, the members 27 and 38 will also remain stationary thereto, and then if the cable 52 be revolved within the exit end members of the casing, the rod 30 will still be in contact with the member 38 and the member 32 will still be in contact with the member 27.

The turning or twisting of the cable 52, therefore, will turn the rod 30 and the member 32 while retaining contact with the incoming current members 27 and 38, and hence, the turning or twisting of the cable 52 will not turn or twist the cable 51.

The same effect will be obtained if the flow of the current be reversed.

The described device assembled as follows: the tubular member 32 with its flange 33 is first inserted into tubular member 27, the spring 41 is then threaded therein and the assembly comprising parts 30, 34, 38 and 35 are inserted by lining up the longitudinal slots 71 and 72 with corresponding lugs 73 and 74 which is accomplished by pressure against the tension of spring 41. When the rear edge of 35 is inserted beyond the inner edges of lugs 73 and 74, it is given a turn so that slots 71 and 72 are out of alignment with the lugs 73 and 74, thus preventing the assembly members from falling out of the device.

The interior construction of the modified form of a device of my invention as shown in Figure 3 is similar to that shown in Figures 1 and 2, the only difference being in the construction of the casing.

In this form of my device the casing is divided vertically instead of longitudinally into two parts 60 and 61, which parts are maintained in removable position to each other by the annular member 62, a part on the inner portion of which is threaded at 63 to co-operate with the threaded portion 64 of the casing 61, while the other inner portion of the member 62 carries a recess to receive the flange 65 of the casing 60.

Figure 5 illustrates a modified form of attaching the casings 20 and 20A which comprises a recess in 75 in the casing 20 to receive a set screw 76 passing into and threadable with an opening in casing 20A, a number of such securing means being employed.

A valuable feature of my device is its adaptability when it is necessary that the operating device be revolved during the application of an electric current thereto.

It will thus be seen that my invention presents devices which, if placed in an electric circuit between the source of supply and the device to be operated, will prevent the twisting of the wires when the operating device is related or revolved, thus overcoming the danger and inconvenience incident thereto.

I do not limit myself to the particular size, shape, number or arrangement of parts as these are mentioned for the sole purpose of clearly describing my invention.

What I claim is:

An exterior casing of dielectric material, a tubular member of current conducting material having an inwardly flanged end opening at one end thereof within said casing, a second tubular member of dielectric material having a flanged end opening at one end thereof within said first mentioned tubular member, dielectric material positioned between said two tubular members, an outwardly extended tubular member of current conducting material having a flanged end opening at one end thereof, spring means within said first mentioned tubular member revolubly abutting the flange of said first mentioned tubular member and said outwardly extended tubular member, a rod of current conducting material positioned within said extended tubular member, a current dielectric material positioned between said rod and said extended tubular member, an annular enlarged end portion of said rod positioned within said inner tubular member, spring means within said inner tubular member revolubly abutting the said rod and the flange of said inner tubular member, means carried by said first mentioned tubular member adapted to be connected to a source of electric current, and means carried by said inner tubular member adapted to be connected to a source of electric current, means carried by said extended tubular member adapted to be connected with a current carrying wire and means carried by said rod adapted to be connected with a current carrying wire.

OLAF GILBERTSON.